J. A. Bailey,
Sawing Stone.
N° 14,532. Patented Mar. 25, 1856.
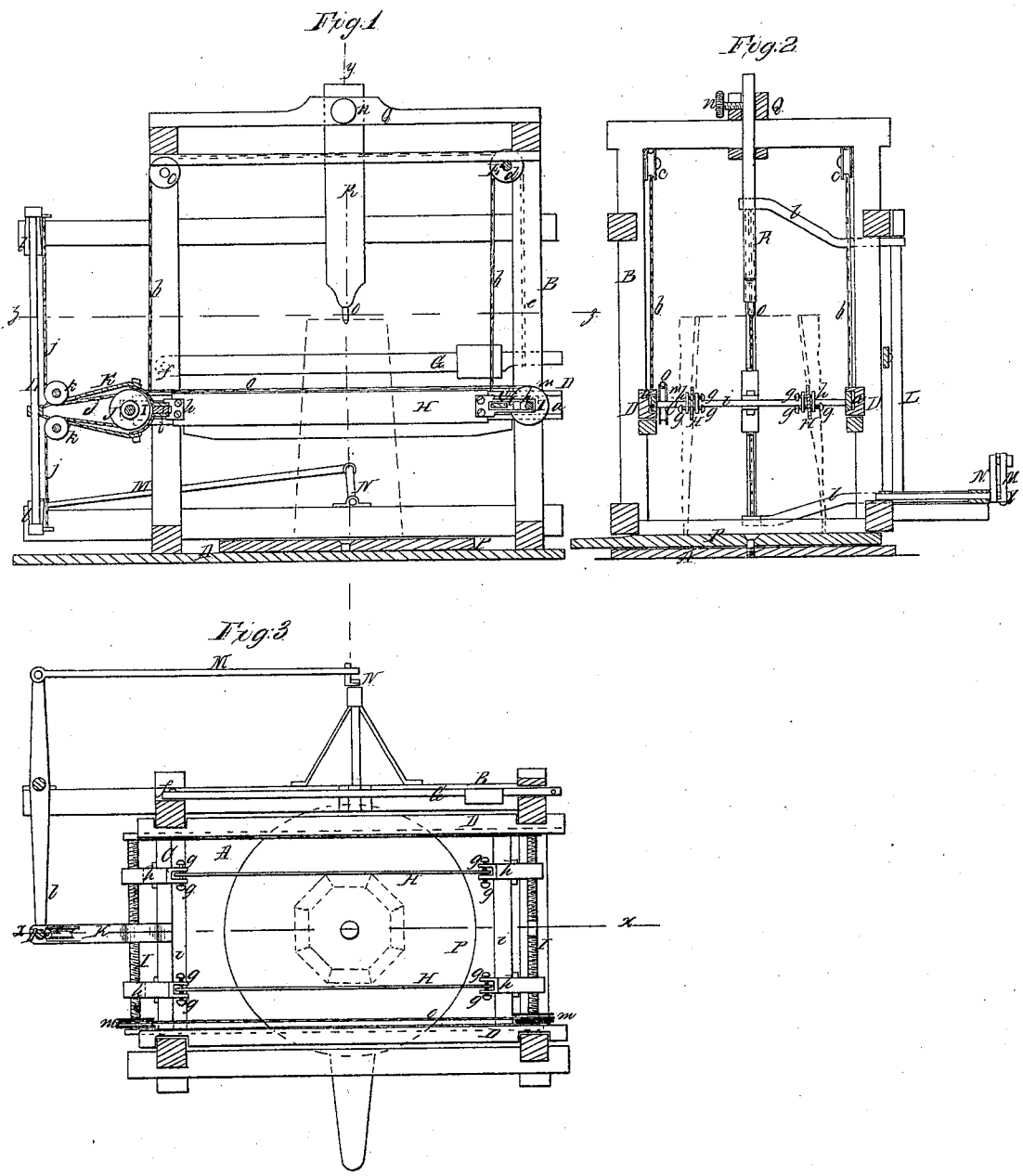

UNITED STATES PATENT OFFICE.

JOHN A. BAILEY, OF DETROIT, MICHIGAN.

MACHINE FOR SAWING MARBLE IN OBELISK FORM.

Specification of Letters Patent No. 14,532, dated March 25, 1856.

*To all whom it may concern:*

Be it known that I, J. A. BAILEY, of Detroit, in the county of Wayne and State of Michigan, have invented a new and useful Machine for Sawing Marble Blocks in Polygonal Taper Form; and I do hereby declare that the following is a full, clear, and exact description of the same, reference being had to the accompanying drawings, making a part of this specification, in which—

Figure 1 is a longitudinal vertical section of my improvement, (*x*), (*x*), Fig. 3, showing the plane of section. Fig. 2, is a transverse vertical section of the same, (*y*), (*y*) Fig. 1, showing the plane of section. Fig. 3, is a horizontal section of the same, (*z*), (*z*), Fig. 1, showing the plane of section.

Similar letters of reference indicate corresponding parts in the several figures.

To enable those skilled in the art to fully understand and construct my invention, I will proceed to describe it.

A, represents a bed piece on which a rectangular frame B, is secured, and C, represents a horizontal saw frame which works in grooves (*a*) cut in the inner sides of bars D, D, which are suspended in the frame B, by chains (*b*), one at each end of the bars. The chains (*b*) at one end of the bars pass over pulleys (*c*), (*c*), on the upper part of the frame B, and are attached to pulleys (*d*), (*d*), on a shaft E, which is placed transversely on the opposite end of the frame B. The chains which are attached to the opposite end of the bars D, D, are attached directly to the pulleys (*d*), (*d*). One end of the shaft E, has a pulley attached to it, to which a chain (*e*), is connected, the lower end of the chain (*e*) being attached to a lever G, which is connected to the side of the frame B, by a pivot (*f*), see Figs. 1 and 3.

H, H, are the saws, the ends of which are connected by set screws (*g*) to the inner ends of loops (*h*), which are fitted loosely on transverse bars (*i*), at each end of the saw frame C. The outer ends of the loops (*h*) have nuts fitted in them through which rods I, having right and left screw threads cut on them, fit. On the front screw rod I, at about its center, there is hung a pulley J, around which a chain (*j*) passes, said chain also passing round pulleys (*k*), (*k*), attached to the outer end of a pitman K, and the ends of the chain are connected to the upper and lower ends of a vertical rod L, to which the outer end of the pitman is attached. The rod L, is fitted between arms (*l*), (*l*,) to the lower end of which one end of a connecting rod M, is attached, the opposite end of the connecting rod being attached to a crank N, at the one side of the frame B. To one end of each screw rod I, there is hung a pulley (*m*), around which a chain O, passes.

To the upper surface of the bed piece A, a circular turntable P, is attached.

The inner end of the pitman K, is attached to the front end of the saw frame C, and its outer end is allowed to slide on the rod L, said rod passing through a hole in the outer end of the pitman.

On the upper part of the frame B, there is secured a longitudinal bar Q, through the center of which a vertical bar R, passes, said bar R, being secured at any desired point by a set screw (*n*). The lower end of the bar is provided with a center pivot (*o*) see Figs. 1, and 2.

Operation: The marble block to be sawed, shown in red, is placed upright upon the turn table P, and the point (*o*) on the bar R, brought down upon the center of its upper end. The saws H, H, are then set, by adjusting the set screws (*g*) so as to correspond with the taper intended to be given the block, that is, their lower or cutting edges are set outward or from each other so that they will be farther apart than their upper edges, see Fig. 2, and the saws are placed the proper distance apart or at such a distance to correspond to the diameter of the upper end of the block, when sawed. Motion is then given the crank N, in any proper manner and a reciprocating motion is communicated to the saw frame C. The saws feed themselves to their work in consequence of the weight of the saw frame C, and bars D, D, which are rather heavier than the lever G, and consequently the chains (*b*,) gradually unwind from the pulleys (*d*), (*d*), on the shaft E. As the saws cut and the pitman K, descends, upon the rod L, the chain (*j*) gradually turns the pulley J, on the front screw rod I, and said rod is also turned as well as the rod at the opposite end of the saw frame C, and the loops (*h*) will be forced apart and consequently the saws H, H, as they descend, and the sides of the block will be cut in taper form. When two opposite sides of the block are sawed, the saw-frames are elevated, the turn table P, turned and the remaining sides are sawed.

The above machine is extremely simple and efficient. A block may be sawed with any number of sides or of any polygonal form and without removing it from the machine from the time it is put into the machine in a rough state until it is finished. The machine is designed chiefly for sawing marble blocks in spiral or taper form, for monuments, etc. Any desired taper may be sawed by placing different sized pulleys on the screw rod I.

Having thus described my invention, what I claim as new and desire to secure by Letters Patent, is—

The peculiar means employed for gradually moving the saws H, H, laterally or apart in the saw frame C, as said saw frame descends, viz: having the pulley J, attached to the center of the right and left screw rod I, and a chain (j) passing around said pulley and also around pulleys, k, k, at the outer end of the pitman K, the ends of the chain (j) being attached to the upper and lower ends of the rod L, to which the outer end of the pitman is attached and on which it slides, motion being communicated from one screw rod to the other by any known means.

JOHN A. BAILEY.

Witnesses:
CHAS. H. SPEED,
HENRY CHASE.